(12) United States Patent
Suzuki (10) Patent No.: US 6,240,481 B1
(45) Date of Patent: May 29, 2001

(54) DATA BUS CONTROL FOR IMAGE FORMING APPARATUS

(75) Inventor: Tomohiro Suzuki, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/216,443

(22) Filed: Dec. 18, 1998

(30) Foreign Application Priority Data

Dec. 22, 1997 (JP) ................................. 9-353807
Dec. 22, 1997 (JP) ................................. 9-353808
Dec. 22, 1997 (JP) ................................. 9-353809

(51) Int. Cl.$^7$ .................................................. G06F 13/00
(52) U.S. Cl. ................................... 710/129; 710/131
(58) Field of Search .......................... 710/126, 129, 710/100, 131; 358/442, 443, 404, 468, 1.14

(56) References Cited

U.S. PATENT DOCUMENTS

| | | | |
|---|---|---|---|
| 4,665,483 | * | 5/1987 | Ciacci et al. .......................... 710/114 |
| 4,860,115 | * | 8/1989 | Ogura ..................................... 358/443 |
| 5,396,345 | * | 3/1995 | Motoyama ............................. 358/448 |
| 5,483,642 | * | 1/1996 | Okazawa et al. ...................... 710/126 |
| 5,920,405 | * | 7/1999 | McIntyre et al. ...................... 358/442 |
| 5,923,439 | * | 7/1999 | Tomida et al. ......................... 358/404 |
| 6,021,448 | * | 2/2000 | Kim ......................................... 710/14 |

* cited by examiner

Primary Examiner—Glenn A. Auve
(74) Attorney, Agent, or Firm—Frishauf, Holtz, Goodman, Langer & Chick, P.C.

(57) ABSTRACT

An image forming apparatus is provided that includes an image data obtaining device that obtains image data corresponding to image information of a document. An image memory receives the image data from the image data obtaining device and stores the image data therein. An image reproducing device receives the image data from the image memory and reproduces the image information. A control device controls the image data obtaining device, the image memory and the image reproducing device by transmitting the image data and command data over a data bus. In addition, an interface device is provided that includes at least a three way interface for transmitting the image data from the image data obtaining device to the image memory, for transmitting the image data from the image memory to the image reproducing device, and for transmitting the image data from the data bus of the control device to the image memory. The interface device sequentially transmits the image data in the image memory in order of memorizing while the image data obtaining device outputs the image data to the image memory.

26 Claims, 7 Drawing Sheets

DATA BUS CONTROL FOR IMAGE FORMING APPARATUS

BACKGROUND OF THE INVENTION

The present invention relates to an image forming apparatus which is preferably applied to an image processing apparatus such as a copying machine, a printer and a facsimile machine. To be more precise, the invention relates to an apparatus wherein a 3-way interface means is connected to an image memory and data bus which is split into two, and after control instruction is given to the interface means, input and output of an image acquisition means and an image reproduction means are controlled on a time series basis by the control instruction independently of the control means so that the control means can execute another data processing.

Recently, a digital copying machine which forms an image based on image data acquired from a document image has been put to practical use. In the copying machine of this type, image information of a document is read by a scanner or the like, and image information of the document is stored temporarily in an image memory. Then, the image information stored in the image memory is subjected to image processing such as image reduction, image enlargement and rotation, to meet a user's demand. Due to this, an image of the document can be printed on a prescribed transfer sheet, based on the image data which have been subjected to image processing.

A digital copying machine of this kind, on the other hand, is equipped with a memory with large capacity for storing image information of a document temporarily, and it needs a technology of efficient data transmission for the image information.

Figure 7:
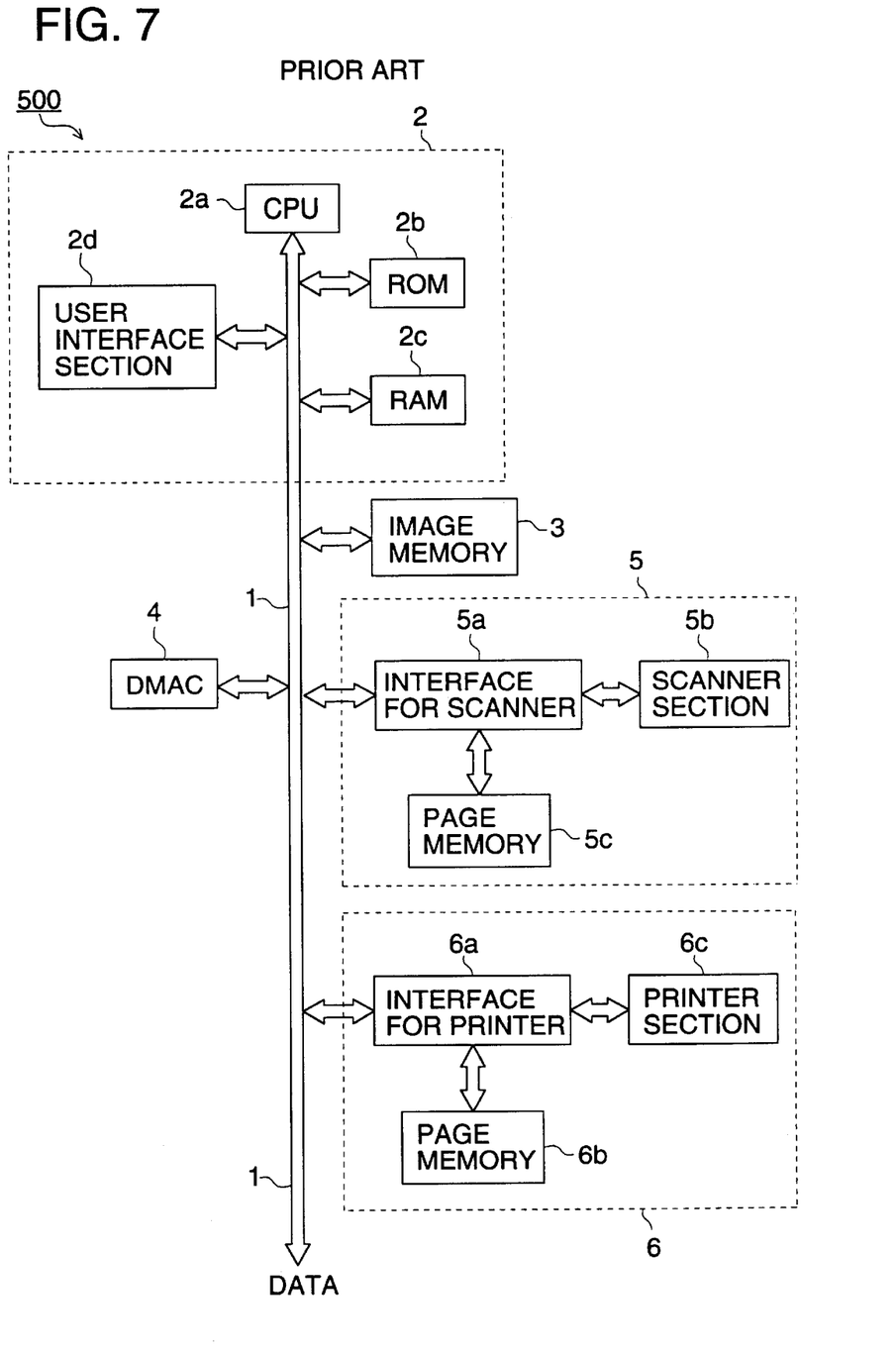
FIG. 7 is a block diagram showing an example of structure of conventional image forming apparatus 500.

FIG. 7 is a block diagram showing an example of the structure of image forming apparatus 500 of a conventional type employing an image memory of this kind. This image forming apparatus 500 is equipped with CPU bus 1 shown in FIG. 7. The CPU bus 1 is connected to system control means 2, image memory 3, direct memory access controller (hereinafter referred to as DMAC) 4, image acquisition means 5 and image reproduction means 6.

The system control means 2 connected to CPU bus 1 has therein CPU2a, ROM2b, RAM2c and user interface section 2d. CPU2a is an IC which conducts overall control of the image forming apparatus 500, and its control program is stored in ROM2b. RAM2c is a memory used temporarily when CPU2a conducts operation, and it is needed for execution of control program.

For example, when control instruction such as a startup directive is outputted to image acquisition means 5 or image reproduction means 6, the control instruction is written in RAM2c by CPU2a, and after that, when an end of writing of image data is notified, those corresponding to the control instruction are verified.

User interface section 2d is one which is needed for interface between the present apparatus and a user, and the instruction of the user interface section makes CPU2a to execute prescribed data processing. Image memory 3 connected to CPU bus 1 is a memory with a relatively large capacity corresponding to plural pages, and it also stores code data by conducting coding processing, though this is not shown. DMAC4 is one which executes data transmission between devices without interposition of CPU2a, and compared with CPU2a, it can transmit data at higher speed.

Image acquisition means 5 connected to the CPU bus 1 has therein scanner-use interface 5a, scanner section 5b and page memory 5c. The scanner-use interface 5a conducts control for driving of scanner section 5b and control for writing and reading of image data (DATA) in page memory 5c. The page memory 5c is a memory for storing image data in quantity equivalent to one page coming from scanner section 5b, and it is needed for adjustment of data transmission speed between the scanner section 5b and CPU2a and for improving use efficiency for CPU bus 1. Since the page memory 5c is provided to adapt with the speed of the scanner, the page memory 5c needs not have the capacity for full or all pages.

Further, image reproduction means 6 connected to CPU bus 1 has therein printer-use interface 6a, page memory 6b and printer section 6c. The printer-use interface 6a conducts control for driving of printer section 6c and control for writing and reading of image data in page memory 6b. The page memory 6b is a memory for storing data to be written in printer section 6c in quantity equivalent to one page, and it is needed for adjustment of data transmission speed between the printer 6c and CPU2a and for improving use efficiency for CPU bus 1. As same as the case for the scanner, the page memory Sc needs not have the capacity for full or all pages.

Next, operations of the image forming apparatus 500 will be explained. First, copying operations for a single document will be explained. First of all, when instruction for one page copy is received from user interface section 2d, scanner driving is instructed from CPU2a to image acquisition means 5. In the scanner-use interface 5a which has received that instruction, the scanner section 5b is driven and image data of a document is acquired from scanner section 5b, and that image data are stored in page memory 5c in succession. When image data equivalent to one page are stored in page memory 5c, the scanner-use interface 5a notifies an end of image data reading to CPU2a.

CPU2a which has received the notification gives to DMAC4 the instruction for transmitting image data from scanner-use interface 5a to printer-use interface 6a. Then, image data equivalent to one page are transmitted from scanner-use page memory 5c to printer-use page memory 6b. When this transmission of image data for one page has been finished, an end of transmission is notified from DMAC4 to CPU2a. Then, printer driving is instructed from CPU2a which has received the aforesaid notification to image reproduction means 6. Then, image data are read from page memory 6b by printer-use interface 6a which has received the aforesaid instruction, and the image data are outputted to printer section 6c. On the printer section 6c, it is possible to copy an image of a document on a transfer sheet or the like based on image data for one page.

Next, operations for making plural sets of copies for plural documents will be explained. First, scanner driving is instructed to image acquisition means by CPU2a which has received the instruction from user interface section 2d. On the scanner-use interface 5a which has received the instruction, when image data equivalent to one page acquired by scanner section 5b have been stored in page memory 5c, an end of reading of image data equivalent to one page is notified to CPU2a from scanner-use interface 5a. Then, data transmission is instructed to DMAC4 by CPU2a which has received the notification, thereby, image data stored in page memory 5c are transmitted to image memory 3.

A series of aforesaid operations are repeated for the number of times equivalent to the number of documents, and all image data are stored in image memory 3. After that, image data thus stored are transmitted to printer-use interface 6a by the instruction of CPU2a. In this case, when image data equivalent to one page are stored by DMAC4 in printer-use page memory 6d from image memory 3, printer startup is instructed to printer-use interface 6a from CPU2a.

When image data equivalent to one page are outputted to printer section 6c by printer-use interface 6a which has received the instruction stated above, an end of printing is notified to CPU2a. Then, transmission of image data on the succeeding page is instructed to DMAC4 from CPU2a which has received the notification, whereby printing is started.

When a series of aforesaid operations are repeated for the number of times equivalent to the number of documents, copies for the first set are finished. Since plural sets of copies are instructed to CPU2a in this example, an instruction for transferring image data on the first page again to printer-use interface 6a from image memory 3 is given to DMAC4. After this, the same operations are repeated for the number of times equivalent to the prescribed number of sets, whereby copies of plural sets can be made.

In the case of image forming apparatus 500 of a conventional type, CPU2a, image memory 3, image acquisition means 5 and image reproduction means 6 are connected to one CPU bus 1, and when making copies of plural sets for plural documents, in particular, CPU bus 1 is arranged to be owned exclusively between image memory 3 and scanner-use interface 5a or between image memory 3 and printer-use interface 6a.

Therefore, there is a problem that CPU (hereinafter referred to as control means) 2a can not execute another data processing by the use of CPU bus 1, while image acquisition means 5 and image reproduction means 6 are using CPU bus 1 in accordance with the control instruction, after the control instruction is given to scanner-use interface 5a and printer-use interface (hereinafter referred to as interface means) 6a.

Therefore, the invention has solved the problems stated above, and its first object is to provide an image forming apparatus wherein a control means can execute another data processing by using another data bus, even when data bus is owned exclusively by an image acquisition means or an image reproduction means in accordance with a control instruction, after the control instruction is given to an interface means.

In the case of image forming apparatus 500 of a conventional type, there is a demand for a data processing apparatus wherein printer and facsimile functions are combined with a copying function by adding a communication means to the main apparatus. For this demand, image memory 3 is required to be used efficiently for conducting memory communication and broadcast. However, in the conventional type, image memory 3, DMCA4, image acquisition means 5 and image reproduction means 6 are connected to one CPU bus 1, and each of the means 5 and 6 is connected to page memories 5c and 6b.

Therefore, scanner-use and printer-use page memories 5c and 6b are not used except for operations of scanner section 5c and printer section 6c, which causes a problem of system structure that efficiency of using a memory is low. Incidentally, page memories 5c and 6b have capacity to record image data for the largest document size (for example, A3 size). Due to this, when copying a document whose size is smaller than A3 size, a memory area which is not used is caused, and efficiency of using a memory is lowered accordingly.

When making plural sets of copies for plural sheets of documents, namely, when making plural sets of copies simultaneously while printing out the first document after reading image data on one page, it is necessary to transfer image data to both of image memory 3 and printer-use page memory 6b from scanner-use page memory 5c, using DMAC4. Therefore, image data need to be split into two groups each being transmitted separately, which makes the transmission time to be about two times the data transmission time for a single document.

Further, there is an occasion where image data on the following page are overwritten accidentally on image data on the preceding page by DMAC4, because a transmission speed of DMAC4 connected to CPU bus 1 is changed by occupancy rate for CPU2a bus. This takes place when reading of image data on the following page is started before image data equivalent to one page are all transmitted from page memory 5a to image memory 3, when the transmission speed of DMAC4 is lowered by the change of occupancy rate for CPU2a bus.

In the same way, when the instruction for startup of the printer is made before image data equivalent to one page are stored in page memory 6b, there is an occasion where underflow of image data is caused and an upper portion of a document is not copied. To avoid this condition, when DMAC (hereinafter referred to as external equipment) 4 is caused to have priority to CPU2a to posses CPU bus 1 exclusively, there are caused problems that the processing speed of CPU2a is lowered, and it is difficult for CPU (hereinafter referred to as external equipment) 2a to execute facsimile processing wherein CPU bus (hereinafter referred to as data bus) 1 and image memory (hereinafter referred to as memory for data) 3 are used.

The invention has solved the problems stated above, and its second object is to provide a data processing apparatus and a system constructing method wherein even when an external equipment on one side possesses data bus exclusively, an external equipment on the other side can execute another data processing by using another data bus, and memories for data can be used commonly on a series of time basis by external equipment each being connected to each data bus.

In the case of image forming apparatus 500 of a conventional type, when the control instruction such as a startup instruction is outputted by CPU2a to scanner-use interface Sa or printer-use interface 6a, and then an end of writing and reading of image data is notified, there sometimes is an occasion wherein there is taken a method to check whether the end of writing and reading is for the aforesaid control instruction or not. Therefore, it is necessary to write the control instruction in RAM2c in advance and to keep it.

Therefore, for the period from outputting of a control instruction such as the startup instruction to scanner-use interface 5a or printer-use interface 6a to notifying of the end of the control instruction, it is necessary to confirm constantly whether the control instruction is recorded in RAM2c or not. Due to this, flow processing for control of input and output for scanner-use interface 5a and printer-use interface 6a is needed, and load of data processing for CPU (hereinafter referred to as a control apparatus) 2a is increased, which is a problem.

The invention has solved the problems stated above, and its third object is to provide an interface apparatus and a data processing system wherein load of data processing for the control apparatus in system superiority can be reduced in terms of data transmission.

SUMMARY OF THE INVENTION

For achieving the first object mentioned above, the image forming apparatus related to the invention is represented by an image forming apparatus having therein an image acquisition means for acquiring image information of a document, an image memory for storing temporarily image information coming from the image acquisition means, an image reproduction means for reproducing image information of the document by reading image information from the image memory, and a control means for controlling input and output of the image acquisition means, the image memory and the image reproduction means, wherein there is provided a plural way interface means having at least a 3-way interface means which conducts writing of image information on the image memory from the image acquisition means, reading of image information from the image memory to the image reproduction means, data transmission between the control means and the image memory, the image acquisition means, or the image reproduction means, or data transmission between the image acquisition means and the image reproduction means, and after the control instruction has been given to the interface means from the control means, input and output of the image acquisition means, the image memory or the image reproduction means are controlled by the control instruction on a time series basis.

The image forming apparatus of the invention wherein a 3-way interface means can control, independently of a control means, input and output of image information makes it possible to read out written image information successively to an image reproduction means when an image acquisition means is writing image information on an image memory, for example. Therefore, after control instruction has been given to the 3-way interface means from the control means, it is possible to make the control means execute another data processing.

For achieving the second object mentioned above, the processing apparatus related to the invention is provided with a memory for data and with a 3-way interface means which conducts writing and reading of data between the aforesaid memory and the first data bus, writing and reading of data between the aforesaid memory and the second data bus, and data transmission between the first data bus and the second data bus, in which two data buses are controlled in terms of input and output by the 3-way interface means on a time series basis.

The data processing apparatus of the invention wherein transmission of data obtained by splitting one data bus into two can be controlled makes it possible to stop writing and reading of data between the second data bus and a memory for data, and to transmit the same data read out of the data-use memory to the second data bus, when an external equipment connected to the first data bus is writing and reading data with the data-use memory, for example.

Therefore, when an external equipment connected to the first data bus is conducting writing and reading of data with a data-use memory, it is possible to make the second data bus to be available for other external equipment. Together with this, an external equipment connected to the first data bus and an external equipment connected to the second data bus can use a data-use memory in common on a time series basis or simultaneously.

The system constructing method related to the invention is characterized in that a 3-way interface means is arranged between a data-use memory and the first and second data buses, a memory for control is provided in the interface means, and the control instruction is written in the memory for control, for writing and reading of data between the data-use memory and the first data bus, for writing and reading of data between the memory and the second data bus, and for data transmission between the first data bus and the second data bus.

The system constructing method related to the invention makes it possible to split one data bus into two parts and thereby to conduct data transmission between the two data buses, and it makes it possible to construct a data processing system which does not give excessive control load to the control apparatus in superiority.

For achieving the third object stated above, the interface apparatus related to the invention is provided with a two-way first interface section which is connected to the first data bus and inputs and outputs data, a two-way second interface section which is connected to the second data bus and inputs and outputs data, an internal data bus connected to the portion between the first and second interface sections, and with a control-use memory which temporarily records control instruction for controlling input and output of the first interface section, the second interface section and the internal bus, in which the control instruction is written on the memory for control when transmitting data between the first data bus and the second data bus.

In the interface apparatus of the invention, data can be transmitted between the first data bus and the second data bus independently of a control apparatus connected to the present interface apparatus, because input and output of the first interface section, the second interface section and the internal data bus can be controlled based on control instruction after the control instruction has been written on the memory for control.

After the control instruction has been written, therefore, it is possible to lighten load of data processing for the control apparatus in the system superiority, because it is not necessary for the control apparatus itself to control input and output of the present interface apparatus.

In the data processing system related to the invention, a 3-way interface means is arranged between a memory and the first and second data buses, a memory for control is provided in the interface means, and the control instruction is written in the memory for control, for writing and reading of data between the data-use memory and the first data bus, for writing and reading of data between the memory and the second data bus, and for data transmission between the first data bus and the second data bus.

In the data processing system related to the invention, it is possible to lighten the load of data processing for a control means because the control means itself does not need to control input and output of the interface apparatus after the control instruction is written in a memory for control use.

DETAILED DESCRIPTION OF THE PREFERRED EMBODIMENT

An image forming apparatus serving as an embodiment of the invention will be explained as follows, referring to the drawings.

(1) Structure example of an interface apparatus

Figure 1:
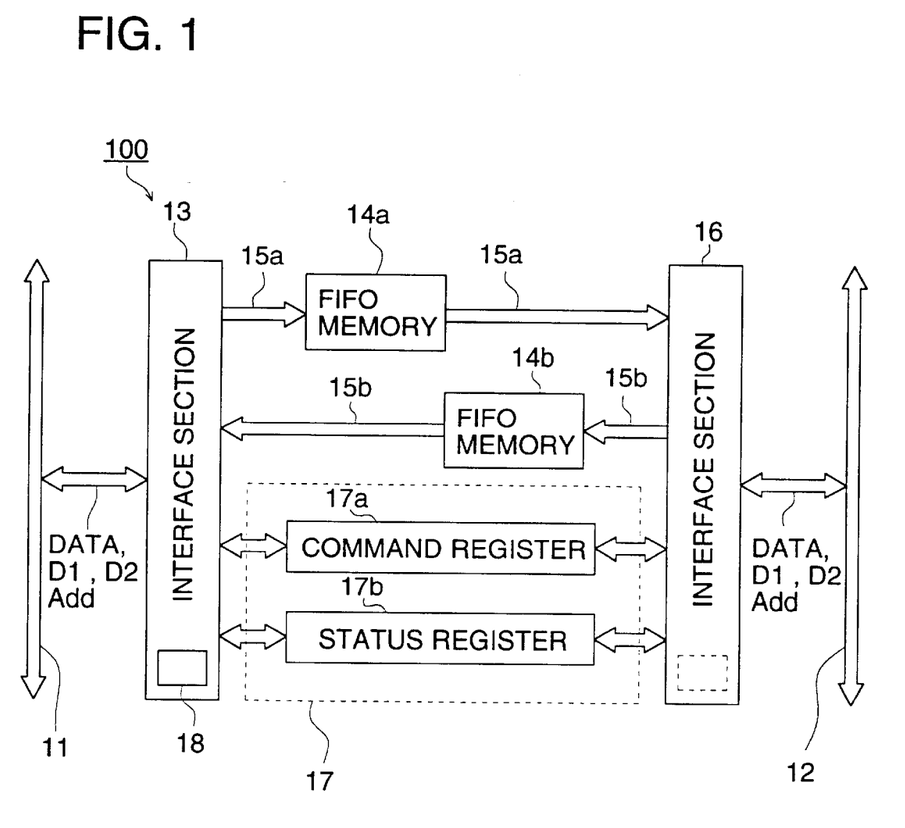
FIG. 1 is a block diagram showing an example of the structure of interface apparatus 100 serving as an embodiment of the invention.

FIG. 1 is a diagram showing a structure example of an interface apparatus applied to an image forming apparatus of the present embodiment.

In the present embodiment, a 3-way interface means is connected to an image memory and to two split data buses, and after control instruction has been given to the interface means, the control instruction controls input and output of an image acquisition means and an image reproduction means on a time series basis independently of a control means, so that the control means can execute another data processing during the period wherein the control instruction is controlling.

Interface apparatus 100 is connected between the first data bus 11 and the second data bus 12 shown in FIG. 1 to be used. To the first data bus 11, there is connected the first interface section 13 which is of a two-way type, and inputting and outputting are conducted between the first interface section 13 and the data bus 11. To the output step toward the inside of the interface section 13, there is connected FIFO memory 14a representing the first memory for data use, and data inputted from the data bus 11 are temporarily stored in the FIFO memory 14a. The FIFO memory 14a is needed for adjusting the data transmission speed between two data buses. Data by the FIFO memory 14a are outputted on a fist-in first-out basis.

To the output step of the FIFO memory 14a, there is connected second interface section 16 through internal data bus 15a. To the output step toward the outside of the interface section 16, there is connected data bus 12 to which data from the data bus 11 are outputted.

To the output step toward the inside of the interface section 16, there is connected FIFO memory 14b representing the second memory for data use, and data inputted from the data bus 12 are temporarily stored in the FIFO memory 14b for the reason stated above. The data are outputted on a first-in first-out basis. To the output step of the FIFO memory 14b, there is connected interface section 13 through internal data bus 15b. To the output step toward the outside of the interface section 13, there is connected data bus 11 to which data from the data bus 12 are outputted.

Between two interface sections 13 and 16 stated above, there is located control-use memory 17 in which control instruction D1 from a control apparatus in system superiority is temporarily recorded, when a data processing system including the interface apparatus 100 is constructed, for example. The control-use memory 17 has therein command register 17a and status register 17b in the present example. The control instruction D1 stated above is recorded in this command register 17a.

As a method to access the interface apparatus 100, there are considered a method to use chip selection signals determined univocally and a method to use an address decoding system. In the address decoding system, when accessing address Add mapped in ROM in advance, the address is driven on data bus 11 by the control apparatus. Due to this, in this method, an address register in the interface apparatus 100 is set, and an access is accepted by decoding the address in the interface apparatus 100. In the following explanation, the latter case is assumed.

For example, in the interface section 13 or the interface section 16, there is provided interface control section 18, and thereby, writing data in and reading data out of FIFO memories 14a and 14b are controlled based on control instruction D1 recorded in command register 17a, and in addition to that, input and output of interface sections 13 and 16 and internal data buses 15a and 15b are controlled.

Figure 2:
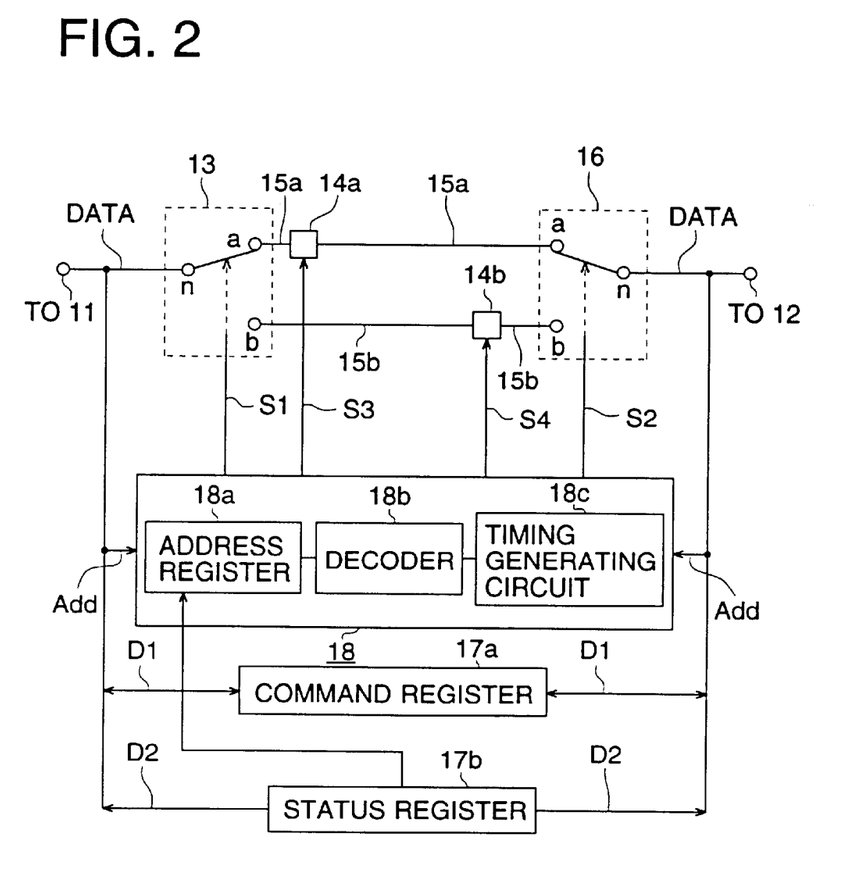
FIG. 2 is a structural diagram showing an example of operations of the interface apparatus 100.

On interface control section 18, there are provided address register 18a, decoder 18b and timing generating circuit 18c all shown in FIG. 2. On the address register 18a, there is set an address of the present interface apparatus 100 in the case of access. Verification of the address of the present interface apparatus is made when the decoder 18b decodes the address. This decoder 18b is also used for decoding control instruction D1. Based on the results of decoding the control instruction D1, switch control signals S1–S4 are generated on the timing generating circuit 18c.

The switch control signal S1 is used for switching bus for interface section 13, and switch control signal S2 is used for switching bus for interface section 16. Memory control signal S3 is used for writing in and reading out of FIFO memory 14a, and memory control signal S4 is used for writing in and reading out of FIFO memory 14b.

In the status register 17b, there is temporarily recorded control notification information. This control notification information is something like end status data D2 showing results of data transmission executed regarding control instruction D1, and a control apparatus in system superiority can judge whether data processing for control instruction D1 given to interface apparatus 100 in advance has been ended or not by receiving this end status data D2.

Next, operations of interface apparatus 100 will be explained with reference to FIG. 2. In this example, control instruction D1 is written on command register 17a when conducting data transmission between data buses 11 and 12.

For example, when transmitting data from data bus 11 to data from data bus 12, control instruction D1 to that effect is written in command register 17a. When this control instruction D1 is received by interface control section 18, the control instruction D1 is decoded by interface control section 18, and data bus 11 is connected to internal data bus 15a in interface section 13 based on switch control signal S1 representing the result of the decoding, while, internal data bus 15a is connected to data bus 12 in interface section 16 based on switch control signal S2.

Then, data inputted from data bus 11 are temporarily recorded in FIFO memory 14a based on memory control signal S3. An object of this is to adjust the data transmission speed on data bus 11 and the data transmission speed on data bus 12. Data recorded in the FIFO memory 14a are read based on memory control signal S3 in the order starting from the data recorded in the first place, and are outputted to data bus 12 through interface section 16.

When transmitting data from data bus 12 to data bus 11, control instruction D1 to that effect is written in command register 17a. When this control instruction D1 is received by interface control section 18, data bus 11 is connected to internal data bus 15b in interface section 13 based on switch control signal S1 decoded by interface control section 18 while, internal data bus 15b is connected to data bus 12 in interface section 16 based on switch control signal S2.

Then, data inputted from data bus 12 are recorded temporarily on FIFO memory 14b based on memory control signal S4, and data transmission speed of data bus 11 and that of data bus 12 are matched each other. Data recorded in the FIFO memory 14b are read based on memory control signal S4 in the order starting from the data recorded in the first place, and are outputted to data bus 11 through interface section 13.

When this data transmission is completed, end status data D2 are written in status register 17b. Incidentally, end status data D2 of interface apparatus 100 itself are naturally written in status register 17b, and when constructing the data processing system by arranging many interface apparatuses 100 of this type at boundaries splitting data bus, end status data D2 from other interface apparatuses 100 can be recorded.

In the arrangement mentioned above, it is possible to judge easily whether the data processing for control instruction D1 given to interface apparatus 100 close to terminal equipment in the data processing system has been finished or not, by confirming contents recorded in status register 17b of interface apparatus 100 arranged to be closest to the control apparatus of the system.

As stated above, the interface apparatus 100 related to the present embodiment makes it possible, after control instruction D1 has been written once in command register 17a, to transmit data between data bus 11 and data bus 12, independently of a control apparatus in system superiority connected to interface apparatus 100, because it is possible to control input and output of interface sections 13 and 16, internal data buses 15a and 15b and to control writing in and reading out of FIFO memories 14a and 14b, based on the control instruction D1.

Accordingly, after writing the control instruction D1 in, it is not necessary for the control apparatus itself to control input and output of interface apparatus 100, thus data processing load for the control apparatus can be lightened.

Since end status data D2 showing the results of data transmission executed with regard to control instruction D1 are temporarily recorded in status register 17b, it is possible to confirm easily the results of data transmission executed with regard to control instruction D1 by reading the data D2 from the command register 17b. Therefore, it is possible to conduct data processing through handshaking between a control apparatus and interface apparatus 100, and to conduct data processing through handshaking between plural interface apparatuses 100.

Figure 3:
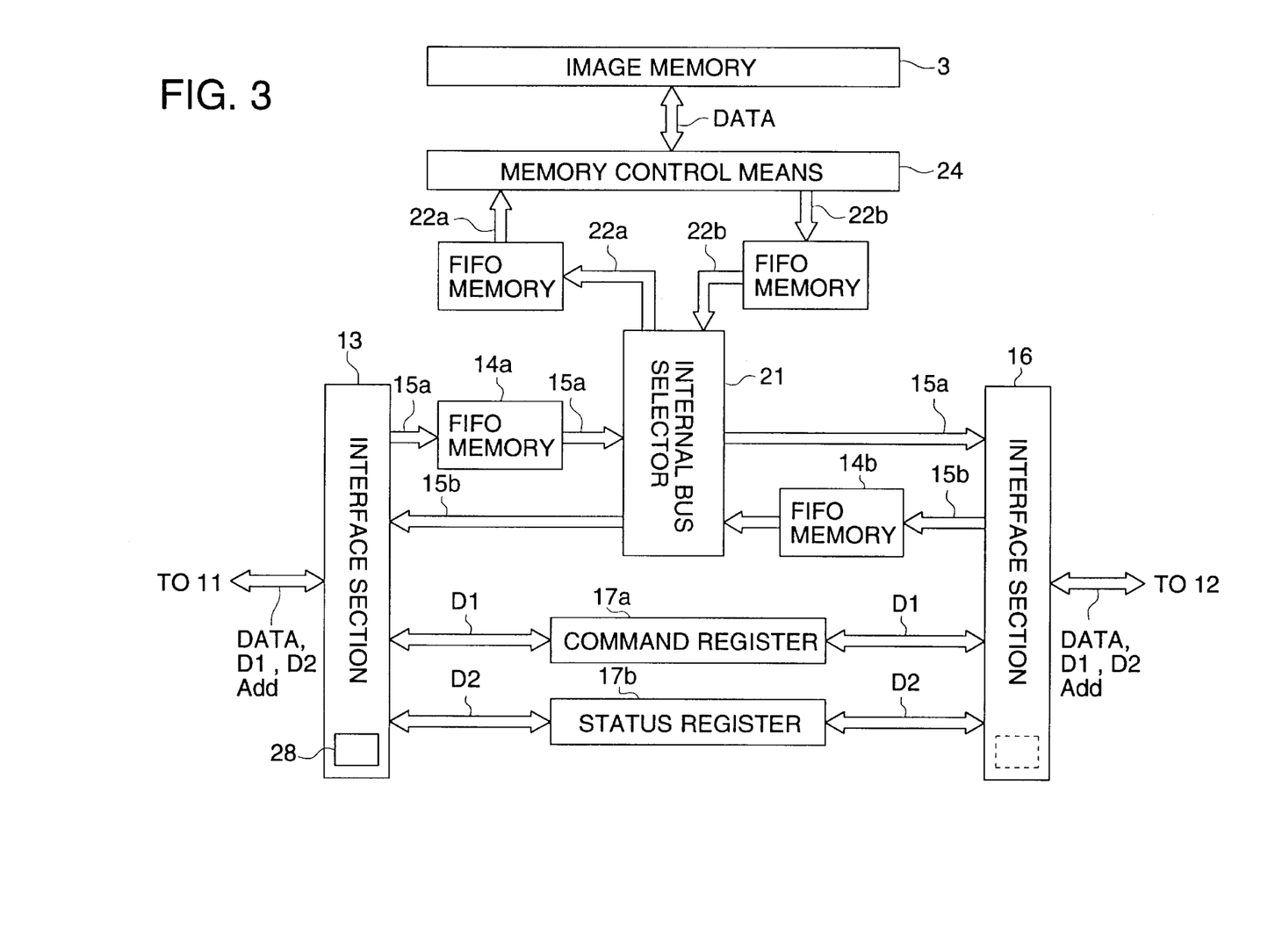
FIG. 3 is a block diagram showing an example of structure of 3-way interface apparatus 200 serving as an embodiment of the invention.

Next, plural way interface including at least 3-way interface apparatus 200 representing the present embodiment as will be explained. FIG. 3 is a block diagram showing an example of structure of the 3-way interface apparatus 200 representing the present embodiment.

In the present embodiment, branch data buses diverged respectively from internal data buses 15a and 15b are connected, and memory control means are connected to the branch data buses, and data inputted and outputted by interface sections 13 and 16 are controlled in terms of writing in and reading out based on control instruction D1. Incidentally, explanation of those having the same symbols and names as those in interface apparatus 100 will be omitted because their functions are the same each other.

In the 3-way interface apparatus 200, there is provided internal bus selector 21 shown in FIG. 3. The internal bus selector 21 has therein switch circuit 21a for 2-circuit-1 selection and single switch circuits 21b and 21c all shown in FIG. 4. For these switch circuits 21a–21c, it is naturally possible to use a transistor circuit integrated with a field effect transistor or a bipolar transistor.

Figure 4:
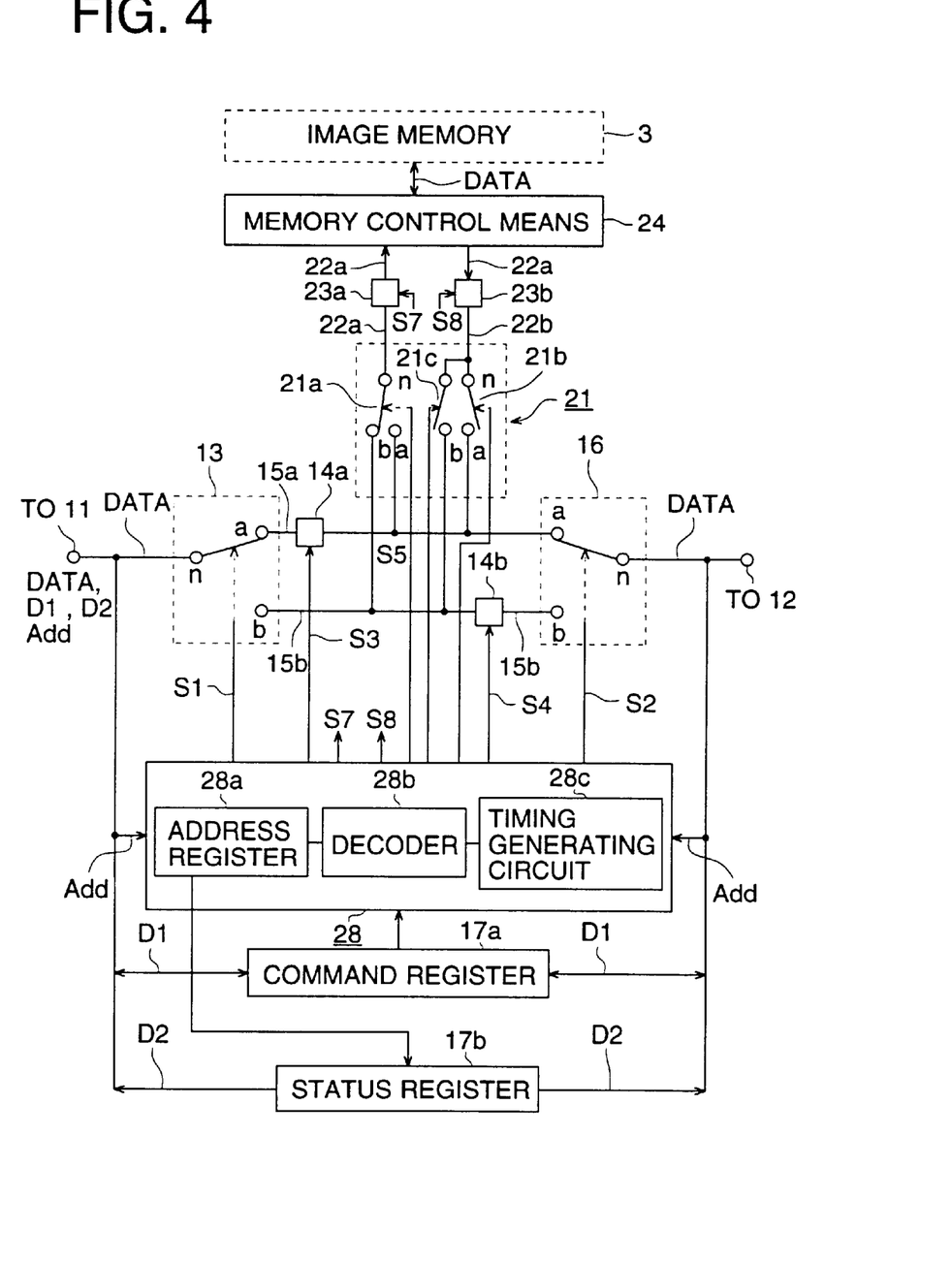
FIG. 4 is a structural diagram showing an example of operations of the interface apparatus 200.

Point "a" of the switch circuit 21a is connected to internal data bus 15a on the output step of FIFO memory 14a, while point "b" thereof is connected to internal data bus 15b on the output step of FIFO memory 14b. Neutral point "n" of the switch circuit 21a is connected to memory bus 22a for writing which serves as a divergence data bus. To this memory bus 22a, there is connected FIFO memory 23a serving as the third memory for data, in which data for writing diverged from the internal data bus 15a or 15b are temporarily stored. To the output step of the FIFO memory 23a, there is connected memory control means 24 which controls writing and reading of data diverged from the internal data bus 15a or 15b. To the output step toward the outside of the memory control means 24, there is connected a memory for data such as an image memory.

To the output step toward the inside of the memory control means 24, there is connected FIFO memory 23b wherein data for reading out for outputting to the internal data bus 15a or 15b are temporarily stored. To the output step of the FIFO memory 23b, there is connected memory bus 22b for reading out. This memory bus 22b is connected to point of contact "n" of switch circuits 21b and 21c. Point "a" of the switch circuit 21b is connected to the input step of interface section 16 through internal data bus 15a, while point "b" of the switch circuit 21c is connected to the input step of interface section 13 through internal data bus 15b.

In the interface section 13 or in the interface section 16 stated above, there is provided interface control section 28 in place of interface control section 18. The interface control section 28 has therein address register 28a, decoder 28b and timing generating circuit 28c, and these functions are mostly the same as address register 18a, decoder 18b and timing generating circuit 18c of the interface control section 18. In the interface control section 28, there are conducted controls for writing in and reading out of FIFO memories 14a, 14b, 23a and 23b, controls of input and output for interface sections 13 and 16 and internal data buses 15a and 15b, and witch controls for switch circuits 21a–21c, based on control instruction D1 recorded on command register 17a.

In the interface control section 28, control instruction D1 is decoded and thereby switch control signals S1–S4 are generated as in the interface control section 18, and in addition, switch control signal S5 used for switching a bus of switch circuit 21a, switch control signal S6 used for switching a bus of switch circuit 21b, memory control signal S7 used for writing in and reading out of FIFO memory 23a, memory control signal S8 used for writing in and reading out of FIFO memory 23b, and switch control signal S9 used for short-circuiting a bus of switch circuit 21c are all generated by timing generating circuit 28c.

Next, operations of interface apparatus 200 will be explained with reference to FIG. 4. In this example, control instruction D1 relating to each of the following nine data transmission events is written in command register 17a. These data transmission events are as follows.

(1) An occasion to transmit data from data bus 11 to data bus (data-through)

(2) An occasion to write data in image memory 3 from data bus 11

(3) An occasion to write data in image memory 3 from data bus 11 and to transmit the same data to data bus 12

(4) An occasion to transmit data from data bus 12 to data bus 11 (data-through)

(5) An occasion to write data in image memory 3 from data bus 12

(6) An occasion to write data in image memory 3 from data bus 12 and to transmit the same data to data bus 11

(7) An occasion to read data out of image memory 3 to data bus 11

(8) An occasion to read data out of image memory 3 to data bus 12, and (9) An occasion to read the same data out of image memory 3 to data bus 11 and data bus 12

For example, in the case wherein control instruction D1 relating to Data Transmission Event (1) is written in command register 17a, when this control instruction D1 is received by the interface control section 28, the control instruction D1 is decoded by the interface control section 28, data bus 11 is connected to internal data bus 15a at interface section 13 based on switch control signal S1 representing the results of the decoding, while at interface section 16, internal data bus 15a is connected to data bus 12 based on switch control signal S2.

At switch circuit 21a, memory bus 22a is disconnected from internal data bus 15a based on switch control signals S5, and at switch circuit 21a, memory bus 22b is disconnected from internal data bus 15b based on switch control signals S6 in the same manner. Then, data inputted from data bus 11 are temporarily recorded on FIFO memory 14a based on memory control signal S3. Data recorded on the FIFO memory 14a are read based on memory control signal S3 in the first-recorded first-read order, and are outputted on data bus 12, passing through interface section 16. Owing to this, it is possible to transmit data from data bus 11 to data bus 12 (data-through).

Further, when control instruction D1 relating to Data Transmission Event (2) is written in command register 17a, data bus 11 is connected to internal data bus 15a based on switch control signal S1 decoded at interface control section 28, while at switch circuit 21a, memory bus 22a and internal data bus 15a are connected with each other based on switch control signal S5.

Then, data inputted from data bus 11 are temporarily recorded on FIFO memory 14a based on memory control signal S3. Data recorded on FIFO memory 14a are recorded on FIFO memory 23a in the first-recorded first-recorded order. Data recorded on FIFO memory 23a are read based on memory control signal S7 and are written in image memory 3.

In this case, memory bus 22b is left to be disconnected from internal data bus 15b. In this case, any type of connection between data bus 12 and internal data buses 15a and 15b is allowed. Owing to this, data can be written in image memory 3 from data bus 11.

Furthermore, when control instruction D1 relating to Data Transmission Event (3) is written in command register 17a, data bus 11 is connected to internal data bus 15a based on switch control signal S1 decoded by interface control section 28, and internal data bus 15a is connected to data bus 12 based on switch control signal S2. On switch circuit 21a, memory bus 22a and internal data bus 15a are connected with each other based on switch control signal S5.

Then, data inputted from data bus 11 are temporarily recorded on FIFO memory 14a based on memory control signal S3. Data recorded on FIFO memory 14a are recorded on FIFO memory 23a in the first-recorded first-recorded order. Simultaneously with the foregoing, data recorded on FIFO memory 14a are outputted to data bus 12. Data recorded on FIFO memory 23a are read based on memory control signal S7 and are written in image memory 3. Due to this, it is possible to write data in image memory 3 from data bus 11 and to transmit simultaneously the same data to data bus 12.

When control instruction D1 relating to Data Transmission Event (4) is written in command register 17a, data bus 11 is connected to internal data bus 15b based on switch control signal S1 decoded by interface control section 28, and internal data bus 15b is connected to data bus 12 based on switch control signal S2.

On switch circuit 21a, memory bus 22a is disconnected from internal data bus 15a based on switch control signal S5, and on switch circuit 21a, memory bus 22b is disconnected from internal data bus 15b based on switch control signal S6, in the same way. Then, data inputted from data bus 12 are temporarily recorded on FIFO memory 14b based on memory control signal S4. Data recorded on the FIFO memory 14b are read based on memory control signal S4 in the first-recorded first-read order, and are outputted on data bus 11, passing through interface section 13. Owing to this, it is possible to transmit data from data bus 12 to data bus 11 (data-through).

Further, when control instruction D1 relating to Data Transmission Event (5) is written in command register 17a, data bus 12 is connected to internal data bus 15b based on switch control signal S2 decoded at interface control section 28, while at switch circuit 21a, memory bus 22a and internal data bus 15a are connected with each other based on switch control signal S5.

Then, data inputted from data bus 12 are temporarily recorded on FIFO memory 14b based on memory control signal S4. Data recorded on FIFO memory 14b are recorded on FIFO memory 23a in the first-recorded first-recorded order. Data recorded on FIFO memory 23a are read based on memory control signal S7 and are written in image memory 3.

In this case, memory bus 22b is left to be disconnected from internal data bus 15b. In this case, any type of connection between data bus 11 and internal data buses 15a and 15b is allowed. Owing to this, data can be written in image memory 3 from data bus 12.

Furthermore, when control instruction D1 relating to Data Transmission Event (6) is written in command register 17a, data bus 11 is connected to internal data bus 15b based on switch control signal S1 decoded by interface control section 28, and internal data bus 15b is connected to data bus 12 based on switch control signal S2. On switch circuit 21a, memory bus 22a and internal data bus 15a are connected with each other based on switch control signal S5.

Then, data inputted from data bus 12 are temporarily recorded on FIFO memory 14b based on memory control signal S4. Data recorded on FIFO memory 14b are recorded on FIFO memory 23a in the first-recorded first-recorded order. Simultaneously with the foregoing, data recorded on FIFO memory 14b are outputted to data bus 11. Data recorded on FIFO memory 23a are read based on memory control signal S7 and are written in image memory 3. Due to this, it is possible to write data in image memory 3 from data bus 12 and to transmit simultaneously the same data to data bus 11.

When control instruction D1 relating to Data Transmission Event (7) is written in command register 17a, data bus 11 is connected to internal data bus 15b based on switch control signal S1 decoded by interface control section 28, and on switch circuit 21b, memory bus 22b and internal data bus 15b are connected with each other based on switch control signal S6. In this example, switch circuit 21c is turned on by switch control signal S9.

Data read out of image memory 3 are temporarily recorded on FIFO memory 23b based on memory control signal S8. Data recorded on FIFO memory 23b are outputted on data bus 11 through interface section 13 in the first-recorded first-outputted order. In this case, memory bus 22a is left to be disconnected from internal data bus 15b. In this case, the internal data bus 15b is kept to be disconnected from data bus 12 based on switch control signal S2. Owing to this, it is possible to read data from image memory 3 to data bus 11.

When control instruction D1 relating to Data Transmission Event (8) is written in command register 17a, data bus 11 is disconnected from data bus 15a based on switch control signal S1 decoded by interface control section 28, and on switch circuit 21b, memory bus 22b and internal data bus 15a are connected with each other based on switch control signal S6.

Data obtained by reading image memory 3 are temporarily recorded on FIFO memory 23b based on memory control signal S8. Data recorded on FIFO memory 23b are outputted to data bus 12 through interface section 16 in the first-recorded first outputted order. In this case, memory bus 22a is left to be disconnected from internal data bus 15b. In this case, the internal data bus 15a is kept to be disconnected from data bus 11 based on switch control signal S1. Owing to this, it is possible to read data from image memory 3 to data bus 12. Incidentally, when executing control instruction D1 concerning Data Transmission Events (1)–(6) and (8), switch control signal S9 keeps switch circuit 21c to be off.

When control instruction D1 relating to Data Transmission Event (8) is written in command register 17a, data bus 11 is connected to internal data bus 15b based on switch control signal S1 decoded by interface control section 28 and data bus 12 is connected to internal data bus 15a based on switch control signal S2. Moreover, memory 22b and internal data bus 15a are connected to each other at switch circuit 21b based on switch control signal S6, and switch circuit 21c is turned on based on switch control signal S9, thus, internal data buses 15a and 15b are short-circuited.

Data obtained by reading image memory 3 are temporarily recorded on FIFO memory 23b based on memory control signal S8. Data recorded on FIFO memory 23b are outputted to data bus 12 through interface section 16 in the first-recorded first outputted order. In this case, memory bus 22a is left to be disconnected from internal data buses 15a and 15b. Due to this, the same data can be read out from image memory 3 to data bus 11 and data bus 12. When some of these Data Transmission Events (1)–(9) are completed, end status data D2 are written in status register 17b, because data transmission results are notified.

As stated above, after the control instruction D1 is written in command register 17a from a control apparatus of the system, interface apparatus 200 of a 3-way type representing the present embodiment makes it possible to write data in image memory 3 from data bus 11 independently of the control apparatus and to read data out of image memory 3 on data bus 12.

Therefore, when constructing a data processing system such as an office computer system or an image forming apparatus and when one data bus is split into two data buses 11 and 12 to transmit data between them, a design is made so that two-way interface apparatus 100 representing the present embodiment is arranged between two data buses 11 and 12.

When conducting writing and reading of data between only one image memory 3 and data bus 11, or when conducting writing and reading of data between the image memory 3 and data bus 12, or when conducting data transmission between the data buses 11 and 12, 3-way interface apparatus 200 representing the present embodiment is connected to image memory 3 and to the data bus 11 and data bus 12. It is preferable that control register 17a is provided in interface apparatuses 100 and 200, and control instruction D1 is written in the command register 17a so that input and output of the interface apparatuses 100 and 200 may be controlled.

Next, a data processing apparatus employing interface apparatuses 100 and 200 will be explained as follows.

(2) Construction example of data processing apparatus

Figure 5:
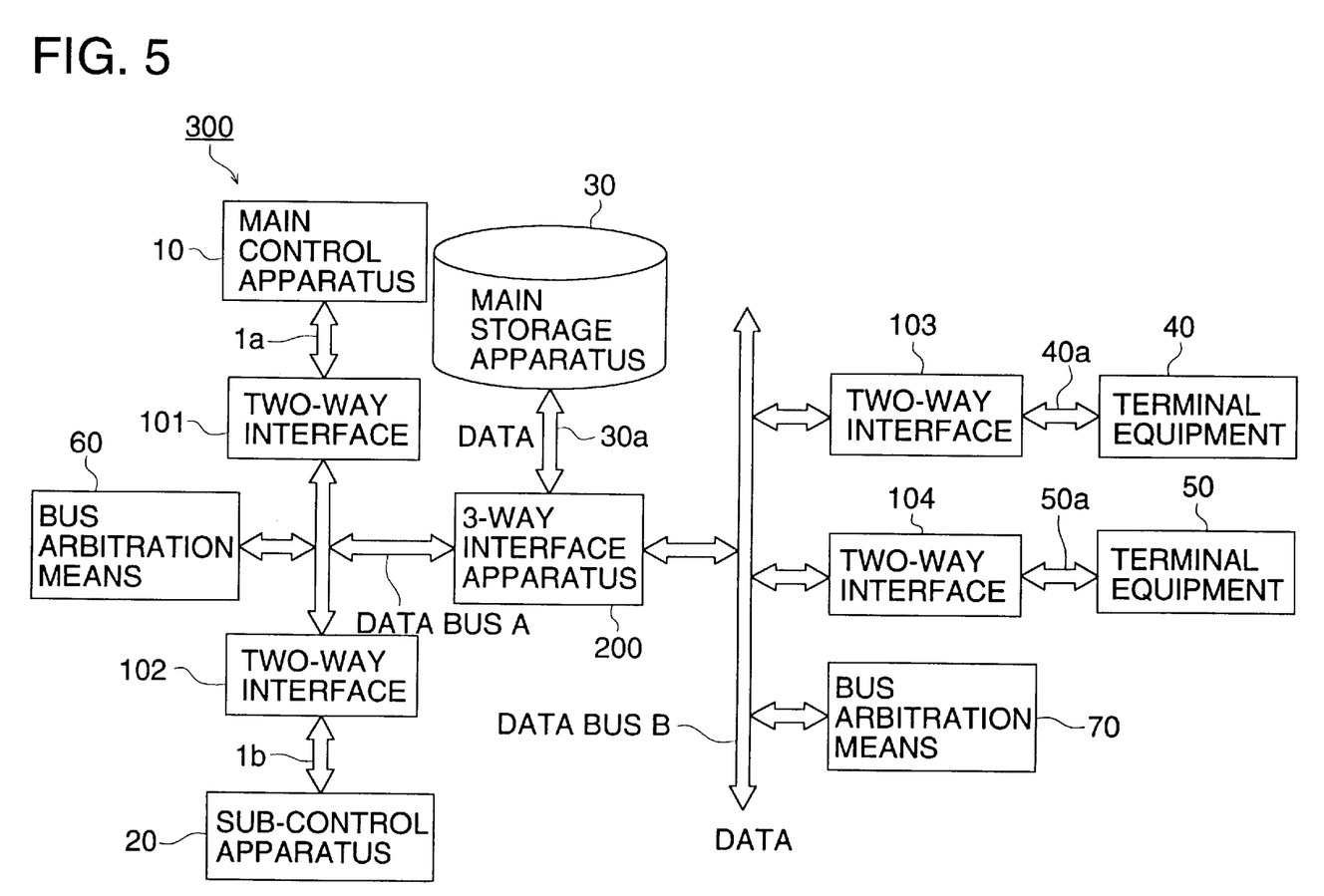
FIG. 5 is a block diagram showing an example of structure of data processing apparatus 300 serving as an embodiment of the invention.

FIG. 5 is a block diagram showing an example of construction of data processing apparatus 300 representing the present embodiment.

In the present embodiment, 3-way interface apparatus 200 is connected to main storage apparatus 30 shown in FIG. 5 and to data buses A and B split into two, and when terminal equipment 40 connected to the data bus B on one side is conducting writing and reading of data between itself and the main storage apparatus 30, the data bus A on the other side is made to be available to main control apparatus 10, and the main storage apparatus 30 is made to be used in common on a time series basis or simultaneously by the main control apparatus 10, sub-control apparatus 20, terminal equipment 40 and terminal equipment 50 connected to data bus A or data bus B.

On data processing apparatus 300, there is provided main storage apparatus 30 which is shown in FIG. 5 and represents a memory for data. To the main storage apparatus 30, there is connected 3-way interface apparatus 200, and control instruction D1 written in command register 17a inside the 3-way interface apparatus 200 conducts writing and reading of data between the main storage apparatus 30 and data bus A, writing and reading of data between the main storage apparatus 30 and data bus B and data transmission between two data buses A and B.

In the example stated above, there are provided two twoway interface apparatuses 101 and 102 on the data bus A. The interface apparatuses 101 on one side is connected to data bus A to be further connected to interface apparatus 102 on the other side and to 3-way interface apparatus 200 and is connected to main control apparatus 10 representing an external equipment through CPU bus 1a.

The interface apparatuses 102 on the other side is connected to data bus A to be further connected to 3-way interface apparatus 200 in the same way, and is connected to sub-control apparatus 20 representing an external equipment through CPU bus 1b. Further, to the data bus A, there is connected bus arbitration means 60 representing the first arbitration means which arbitrates the right to use a bus for interface apparatuses 101 and 102 so that data collision may not be caused.

Further, on the data bus B, there are provided two twoway interface apparatuses 103 and 104. The interface apparatus 103 on one side is—connected to data bus B to be further connected to the interface apparatus 104 on the other side and to 3-way interface apparatus 200, and is connected to terminal equipment 40 representing an external equipment through bus 40a for terminals.

The interface apparatus 104 on the other side is connected to data bus B in the same way to be further connected to 3-way interface apparatus 200, and is connected to terminal equipment 50 representing an external equipment through bus 50a for terminals. Further, to the data bus B, there is connected bus arbitration means 70 representing the second arbitration means which arbitrates the right to use a bus for interface apparatuses 103 and 104.

For all of the interface apparatuses 101–104 mentioned above, two-way interface apparatus 100 representing the present embodiment is used, and control instruction D1 written in command register 17a provided inside the two-way interface apparatus 100 conducts data transmission control. In this example, control instruction D1 is written in command register 17a inside interface apparatus 200, when data are transmitted between at least data bus A and main storage apparatus 30, when data are transmitted between the main storage apparatus 30 and data bus B, or when data are transmitted between the data buses A and B. The control instruction D1 is written by main control apparatus 10 or sub-control apparatus 20.

Next, operations of data processing apparatus 300 will be explained. For example, an occasion where data are written from terminal equipment 40 to main storage apparatus 30 is assumed for explanation. In this case, control instruction D1 relating to Data Transmission Event (5) stated above is written in command register 17a of interface apparatus 200.

Prior to this, control instruction D1 relating to Data Transmission Event (1) is written from main control apparatus 10 in unillustrated command register 17a in interface apparatus 101 and in unillustrated command register 17a in interface apparatus 200. Then, control instruction D1 relating to Data Transmission Event (4) is written from main control apparatus 10 in interface apparatus 103, and after that, control instruction D1 relating to Data Transmission Event (5) is written in interface apparatus 200.

After each control instruction D1 is decoded by interface apparatuses 101, 200 and 103, data bus B is connected with terminal-use bus 40a at interface apparatus 103, and data bus B is connected with memory bus 30a at interface apparatus 200. Operations in each of interface apparatuses 101, 200 and 103 are as stated above. For example, owing to connection operations of interface apparatuses 103 and 200, it is possible to write data from terminal equipment 40 to main storage apparatus 30 through data bus B.

In this example, when writing data from terminal equipment 40 to main storage apparatus 30, and when reading data out from main storage apparatus 30 to terminal equipment 50, data bus A is disconnected from data bus B by 3-way interface apparatus 200. Therefore, data bus A can be made to be available to main control apparatus 10 and sub-control apparatus 20. Due to this, main control apparatus 10 connected to data bus A can conduct transmission of other data with sub-control apparatus 20 through interface apparatuses 101 and 102. Further, it is possible to transfer the same data obtained through reading from main storage apparatus 30 based on control instruction D1 relating to Data Transmission Event (9) stated above to main control apparatus 10, sub-control apparatus 20 terminal equipment 50. Due to this, the main storage apparatus 30 can be used commonly on a basis of the series of time or simultaneously by the main control apparatus 10 connected to data bus A and sub-control apparatus 20 and by terminal equipment 40 and 50 connected to data bus B.

In the data processing apparatus representing the present embodiment, it is possible to control input and output of data buses A and B by means of two-way interface apparatuses 101–104 and 3-way interface apparatus 200. It is therefore possible to conduct data transmission control like that of conventional image forming apparatus 500 wherein CPU bus 1 is split into two.

Next, an image forming apparatus employing data processing apparatus 300 will be explained.

(3) Example of application of a data processing apparatus

Figure 6:
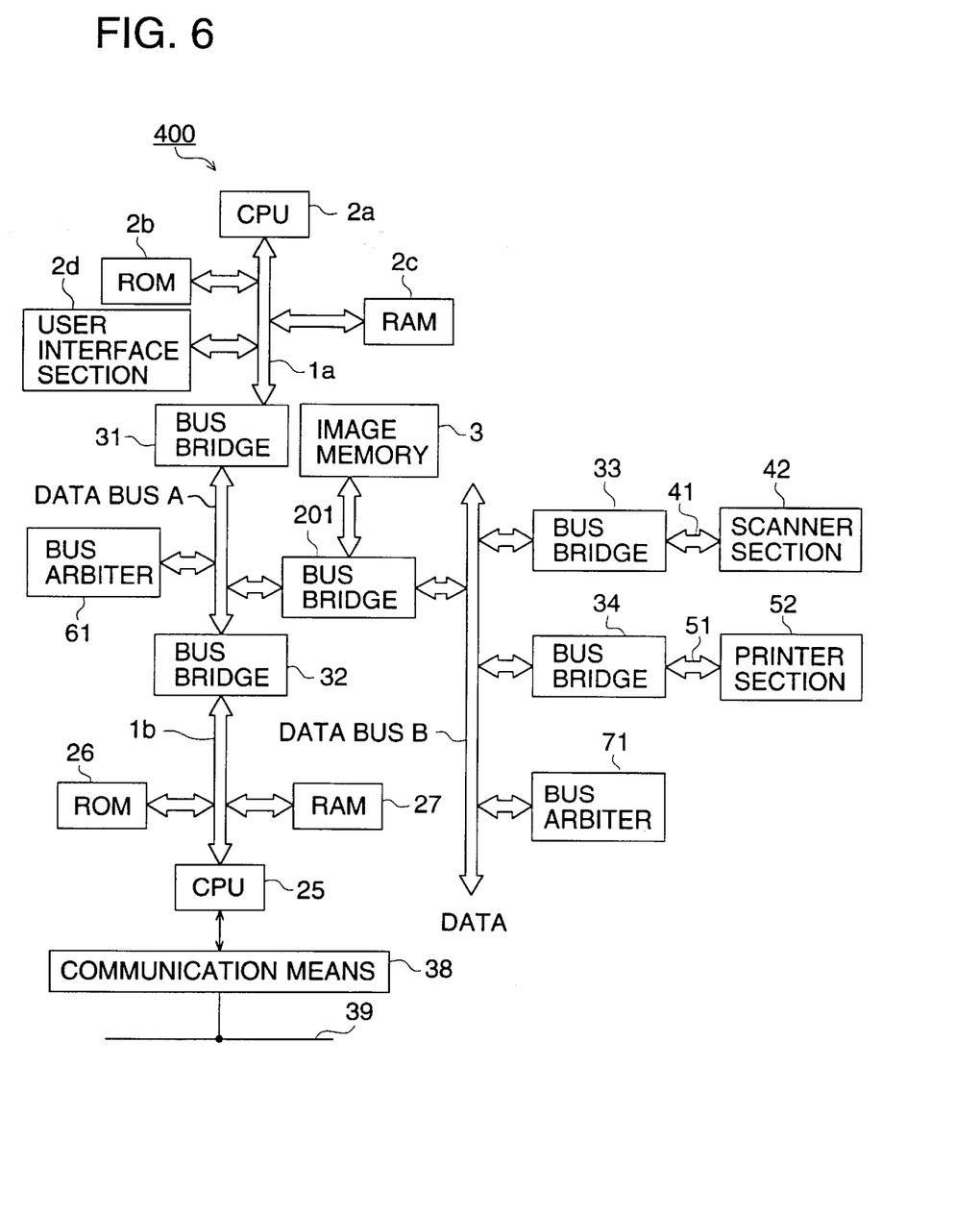
FIG. 6 is a block diagram showing an example of structure of image forming apparatus 400 serving as an embodiment of the invention.

FIG. 6 is a block diagram showing an example of structure of image forming apparatus 400 representing the present embodiment. In the present embodiment, bus bridge 201 for memory use is connected to image memory 3 shown in FIG. 7 and to two split data buses A and B so that input and output of scanner section 42 and printer section 52 can be controlled on a series of time basis independently of CPU2a by control instruction D1 after the control instruction D1 is given to the bus bridge 201, and thereby the CPU2a can execute another data processing during the above-mentioned period.

In the image forming apparatus 400, there is provided bus bridge 201 shown in FIG. 6 representing a 3-way interface means. This bus bridge 201 employs 3-way interface apparatus 200 relating to the present embodiment.

To this bus bridge 201, there is connected image memory 3 wherein image data of a document are temporarily stored. In the present example, writing and reading of image data are conducted between the image memory 3 and data bus A, writing and reading of image data are conducted between the image memory 3 and data bus B, and image data transmission is conducted between two data buses A and B, all by control instruction D1 written in command register 17a in the bus bridge 201.

In the present example, two two-way bus bridges 31 and 32 are provided on data bus A. The bus bridges 31 on one side is connected to data bus A to be further connected to the bus bridges 32 on the other side and to memory-use bus bridge 201, and it is further connected to CPU2a through CPU bus 1a. To the CPU2a, there are connected ROM2b, RAM2c and user interface section 2d in the same way as in the conventional system so that overall control of image forming apparatus 400 may be conducted. Explanation of these functions will be omitted (see FIG. 7).

The bus bridge 32 on the other side is connected to data bus A to be further connected to bus bridge 201, and is connected through CPU bus 1b to CPU25 that controls a communication modem. ROM26 and RAM27 connected to CPU bus 1b are those supporting CPU25. Further, bus arbiter 61 serving as the first arbitration means is connected to data bus A, thereby, arbitration of the right of using for bus bridge 31 and bus bridge 32 is conducted so that no data collision may be caused.

Two two-way bus bridges 33 and 34 are provided also on data bus B. The bus bridges 33 on one side is connected to data bus B to be further connected to the bus bridges 34 on the other side and to bus bridge 201, and it is further connected to scanner section 42 representing an image acquisition means through scanner-use bus 41. On the scanner section 41, an image of a document is acquired based on input control of bus bridge 33, and image data of the document are outputted.

The bus bridges 34 on the other side is equally connected to data bus B to be further connected to bus bridge 201, and it is further connected to printer section 52 representing an image reproduction means through printer-use bus 51. On the printer section 52, image data are given based on output control of the bus bridge 34, and an image of a document is reproduced based on the image data.

Further, bus arbiter 71 serving as the second arbitration means is connected to data bus B, thereby, arbitration of the right of using for bus bridge 33 and bus bridge 34 is conducted.

All of the bus bridges 101–104 stated above employ two-way interface apparatus 100 representing the present embodiment, and data transmission is controlled by control instruction D1 written on command register 17a provided inside the two-way interface apparatus. In this example, when data transmission is conducted at least between data bus A and image memory 3, or when data transmission is conducted between image memory 3 and data bus B, or when data transmission is conducted between data buses A and B, control instruction D1 is written in command register 17a inside bus bridge 201.

In this example, after control instruction D1 is written by CPU2a or CPU25 in bus bridge 201, input and output of scanner section 42 and printer section 52 are controlled on a series of time basis by the control instruction D1.

Next, operations of image forming apparatus 400 representing the present embodiment will be explained. First of all, an occasion for copying a single (single page) document will be explained. In this example, explanation will be conducted under the assumption that image data of the document acquired in scanner section 42 are temporarily transmitted to image memory 3, and then, image data are read out of the image memory 3 to be supplied to printer section 52.

For example, when copying for one page is instructed from user interface section 2d to CPU2a, the CPU2a instructs bus bridge 33 to drive a scanner for driving scanner section 42. In this case, the instruction for driving the scanner is sent through bus bridge 31 and bus bridge 201, because bus bridge 33 and CPU2a are not connected respectively to data bus A and data bus B directly.

In the case of the instruction for driving the scanner, control instruction D1 is sent from CPU2a to bus bridge 31. In this case, an address generated at CPU2a shows bus bridge 31 which has been subjected to mapping in advance. Accordingly, bus bridge 31 drives the control instruction D1 and the address to data bus A. Since an address given to the control instruction D1 designates bus bridge 33 connected to data bus B at bus bridge 201 connected to the data bus A, this control instruction D1 and the address are driven to data bus B. Due to this, the control instruction D1 and the address from bus bridge 201 are received at bus bridge 33 and driving of scanner section 42 is controlled.

Then, the destination of image data to be outputted from scanner section 42 and the number of transmission bytes are instructed from CPU2a to bus bridge 33. In this case, control instruction D1 with which CPU2a instructs, through CPU bus 1a, an address of bus bridge 33 and a place to store image data as stated above is driven on data bus A. Due to this, the control instruction D1 is transmitted to bus bridge 33 through bus bridge 31 and bus bridge 201. At the bus bridge 33 which has received the control instruction D1, preparation to write image data from scanner section 42 in an address of designated image memory 3 is started.

For this writing, the bus bridge 33 makes a demand for use of data bus B to bus arbiter 71. The bus arbiter 71 gives permission of the use of data bus B to the request for using a bus having the top priority at that time, in accordance with the prescribed algorithm which is built in the bus arbiter 71. In this case, the permission for using data bus B is given to bus bridge 33, because no request for using a bus is addressed from bus bridge 201 and bus bridge 34. At the bus bridge 33 which has received the permission, an address of the designated image memory 3 is driven to data bus B.

At the bus bridge 201 which has received the address of image memory 3, it is detected by decoding of the control instruction D1 that the access is for the image memory 3. Therefore, image data driven on data bus B are stored in image memory 3 through the aforesaid internal data bus 15b of bus bridge 201 and FIFO memory 23a (see FIG. 4).

If an address of image memory 3 and an address of bus bridge 34 are established to be of the same value on an address map of CPU2a in this case, it is possible to store image data from scanner section 42 in image memory 3 and to print out an image of a document by printer section 52 simultaneously.

While image data having the number of transmission bytes designated by CPU2a are being stored in image memory 3 by bus bridge 33, neither CPU bus 1a nor data bus A is not used for transmission of image data. Therefore, CPU2a and CPU25 can conduct job such as communication processing instructed newly.

After completion of transmission of image data equivalent to the designated number of bytes, the bus bridge 33 notifies CPU2a of an end of data transmission. In this case, data bus B is driven to designate an address of bus bridge 31, so that end status data D2 may be recorded on status register 17b in bus bridge 31 at bus bridge 33.

Since this data bus B is driven, an address is decoded at bus bridge 201, and an address of bus bridge 31 and end status data D2 are driven to data bus A. Due to this, end status data D2 is stored in the aforesaid status register 17b because an address to the bus bridge itself is driven at bus bridge 31.

Since contents of status register 17b are changed in the bus bridge 31, the contents are notified to CPU2a. Therefore, CPU2a can detect that the transmission of image data from scanner section 42 to image memory 3 has been completed, by reading register 17b of bus bridge 31.

CPU2a which has received the notice of the end of data transmission instructs bus bridge 34 of the startup of printer section 52. In this case, the address driven by CPU bus 1a one which instructs bus bridge 34. Therefore, control instruction D1 for the bus bridge 34 is stored in command register 17a of the bus bridge 34 through bus bridge 31 and bus bridge 201. After that, CPU2a instructs the bus bridge 34 of the place where image data are stored and the number of its bytes, thus, preparation for the start of printing is carried out.

Then, in the bus bridge 34, the use of data bus B is requested to bus arbiter 71 for data transmission. In the bus arbiter 71 which has received this request, a permission is given, in accordance with the prescribed algorithm, for the request for using a bus having the top priority at that time. In this case, a permission for using data bus B is given to the bus bridge 34, because no request for using a bus is presented from bus bridge 201 and bus bridge 33. In the bus bridge 34 which has received this permission, an address of image memory 3 is driven to data bus B.

In the bus bridge 201 which has received the address of image memory 3, the address is decoded, and it is detected by the results of the decoding that the access is for the image memory 3. In the bus bridge 201, therefore, image data are read out from image memory 3 having the address designated by CPU2a, and the image data is driven on data bus B. The image data driven on the data bus B are taken in by the bus bridge 34, and their image data are outputted to printer section 52.

In the bus bridge 34, when the print out equivalent to the designated bytes is completed, transmission end status is stored in status register 17b in the aforesaid bus bridge 31. In this way, it is possible to use CPU bus 1a and data bus A for the following job of CPU2a for the period from transmission of startup command to bus bridge 33 to completion of copying for one page of a document.

Next, an occasion for copying on plural sets of transfer sheets for plural documents will be explained. Even in this case, CPU2a sends control instruction D1 for the control of driving scanner section 42 to bus bridge 33 in accordance with instruction from user interface section 2d. Further, the address which stores the image data obtained through reading by scanner section 42 and the number of bytes for the reading are established, and image data reading is started. In this case, it is also possible to store the read image data in image memory 3 while printing them out as state above, by setting the address of the bus bridge 34 to be the same as that of image memory 3.

In this example, CPU2a instructs the bus bridge 34 to start printer section 52, after reading of image data for the first page of a document is completed. Further, in this case, CPU2a instructs bus bridge 33 to start reading the second page, if image memory 3 has thereon a room for memory area equivalent to one page. Each of bridges 33 and 34 presents a request for using data bus B to bus arbiter 71. For bus bridge 33 or bus bridge 34 whichever has received the permission for the request, the data transmission mentioned above is conducted. When the same operation stated above has been repeated for the number of sheet for the first page of a document, one set of copying for the first page of the document is completed. For making copies for plural sets, the bus bridge 34 is started in succession, and thus, copying for the number of sets established in advance is completed.

Since it is possible for image forming apparatus 400 representing the present embodiment to control input and output of image data by the use of bus bridge 201 that is exclusive for memory independently of CPU2a as stated above, an image of a document can be copied at printer section 42 based on image data from scanner section 42 simultaneously when the scanner section 42 is writing image data in image memory 3. Therefore, after control instruction D1 is given to bus bridge 201 from CPU2a, it is possible to cause CPU2a to execute another data processing such as communication processing.

In this example, communication means 38 is connected to CPU25, and image data of a document obtained by scanner section 42 are transmitted to communication line 39, or image data of a document sent by the use of the communication line 39 are received. Image data of a document which have been received by the communication means 38 can also be subjected to reproduction output by printer section 52.

Incidentally, CPU2a and CPU25 may also represent the same one. When CPU2a and CPU25 represent the same one, bus bridge 31 and bus bridge 32 can be of the same structure. Due to this, contents of an address map equipped in ROM2b or the like can be simplified.

Since image memory 3 can be used commonly by scanner section 42 and printer section 52 in the present embodiment, a page memory used in the conventional system is not necessary, and efficiency of using the image memory 3 can be improved.

Further, since a single data bus used in the conventional system can be split into two portions of A and B, it is possible to introduce DMAC without being anxious about an influence with CPU2a. Therefore, the speed of transmitting image data can be enhanced by providing DMAC functions in interface control section 18 in bus bridges 31–34 and in interface control section 28 in bus bridges 201.

As explained above, the image forming apparatus of the invention is one wherein, after a control instruction has been given to a 3-way interface means, input and output of an image acquisition means and an image reproduction means are controlled by the control instruction on a basis of the series of time.

Owing to the structure stated above, input and output of image information can be controlled by an interface means independently of a control means. It is therefore possible to read out the written image information on an image reproduction means when an image acquisition means is writing the image information on an image memory, for example. After the control instruction has been given to the 3-way interface means from the control means, therefore, it is possible to cause the control means to execute another data processing.

The present invention is extremely suitable for application to an image processing apparatus such as a copying machine, a printer and a facsimile machine.

What is claimed is:

1. An image forming apparatus, comprising:
   image data obtaining means for obtaining image data corresponding to image information of a document;
   an image memory that receives the image data from the image data obtaining means and stores the image data therein;
   image reproducing means for receiving the image data from the image memory and reproducing the image information;
   control means for controlling the image data obtaining means, the image memory and the image reproducing means by command data, said control means comprising a data bus to transmit the image data and command data; and
   interface means comprising at least a three way interface for transmitting the image data from the image data obtaining means to the image memory, for transmitting the image data from the image memory to the image reproducing means, and for transmitting the image data from the data bus of the control means to the image memory;
   wherein the interface means sequentially transmits the image data in the image memory in order of memorizing while the image data obtaining means outputs the image data to the image memory.

2. The image forming apparatus of claim 1, wherein the interface means comprises a control memory that stores the command data, and wherein the image data obtaining means, the image memory, and the image reproducing means are controlled in accordance with the command data stored in the control memory.

3. The image forming apparatus of claim 1, wherein the control means comprises a first data bus and a second data bus, and wherein the interface means comprises a first two-way interface section connected with the first data bus, a second two-way interface section connected with the second data bus, and a branch data bus connected with the image memory.

4. The image forming apparatus of claim 3, wherein the interface means further comprises an internal data bus provided between the first two-way interface section and the second two-way interface section, and a control memory that stores the command data, and wherein said branch data bus is branched from the internal data bus, and said command data is used to control the first two-way interface section, the second two-way interface section and the internal data bus.

5. The image forming apparatus of claim 4, wherein the interface means comprises a memory control means provided between the branch data bus and the image memory for controlling data transmission between the branch data bus and the image memory.

6. The image forming apparatus of claim 5, wherein the interface means further comprises a first FIFO memory that temporarily stores data passing through the first two-way interface section, a second FIFO memory that temporarily stores data passing through the second two-way interface section, and a third FIFO memory that temporarily stores data passing through the memory control means, and wherein writing and reading for the first, second and third FIFO memories are controlled in accordance with the command data stored in the control memory.

7. The image forming apparatus of claim 5, wherein the control memory temporarily stores data indicating a result of data transmission conducted in accordance with the command data.

8. The image forming apparatus of claim 4, wherein the control means outputs the command data when data are transmitted between the first data bus and the image memory, when data are transmitted between the second data bus and the image memory, or when data are transmitted between the first data bus and the second data bus, and wherein the command data are stored each time in the control memory.

9. The image forming apparatus of claim 3, wherein the first data bus comprises at least two sets of two-way interface means and a first bus arbitrating means for arbitrating a right to use the first data bus between the two sets of two-way interface means thereof, and the second data bus also comprises at least two sets of two-way interface means and a second bus arbitrating means for arbitrating a right to use the second data bus between the two sets of two-way interface means thereof.

10. The image forming apparatus of claim 9, wherein each of the two sets of two-way interface means comprises a first two-way interface section, a second two-way interface section, an internal data bus and a control memory that temporarily stores the command data, and wherein the command data is used to control the first two-way interface section, the second two-way interface section and the internal data bus.

11. The image forming apparatus of claim 3, wherein the control means is connected to the first data bus through a first two-way interface, the image data obtaining means is connected to the second data bus through a second two-way interface and the image reproducing means is connected to the second data bus through a third two-way interface.

12. The image forming apparatus of claim 11, further comprising external means for obtaining external image data, and wherein the external means is connected to the first data bus through another two-way interface.

13. The image forming apparatus of claim 12, wherein the external means obtains the external image data through an external communication line.

14. The image forming apparatus of claim 1, wherein the control means comprises a CPU, a ROM, a RAM and an operating section.

15. An image forming apparatus, comprising:
an image data obtaining device that obtains image data corresponding to an image of a document;
an image memory that receives the image data, stores the image data therein, and outputs the image data therefrom;
an image reproducing device that receives the image data and reproduces an image based on the received image data;
a control device that comprises a CPU that outputs command data, and a data bus that transmits the image data and command data; and
an interface device comprising at least a three way interface that: (i) transmits the image data from the image data obtaining device to the image memory, (ii) transmits the image data from the image memory to the image reproducing device, and (iii) transmits the image data from the data bus of the control device to the image memory;
wherein the control device controls the image data obtaining device, the image memory, the image reproducing device, and the interface device by the command data, such that the interface device selectively connects one of the image data obtaining device, the image reproducing device and the data bus of the control device with the image memory.

16. The image forming apparatus of claim 15, wherein the interface device comprises a control memory that stores the command data outputted from the control device so that the image data obtaining device, the image memory, and the image reproducing device are controlled in accordance with the command data stored in the control memory.

17. The image forming apparatus of claim 15, wherein the plural way interface device sequentially transmits the image data in the image memory in order of memorizing while the image data obtaining device outputs the image data to the image memory.

18. The image forming apparatus of claim 15, further comprising a data receiving device that receives external image data from an external device, and wherein the external device is connected to the data bus of the control device through a two-way interface device.

19. The image forming apparatus of claim 18, wherein the data receiving device receives the external image data through an external communication line.

20. The image forming apparatus of claim 15, wherein the control device comprises a ROM, a RAM and an operating section.

21. A system for processing data, comprising:
an image memory that receives image data, stores the image data therein, and outputs the image data therefrom;
a first data bus that is connected to a control device having a CPU, and that transmits the image data and command data outputted by the control device;
a second data bus adapted to be connected to a terminal device and to transmit the image data; and
an interface device comprising at least a three way interface that: (i) transmits the image data between the first data bus and the image memory, (ii) transmits the image data between the second data bus and the image memory, and (ii) transmits image data between the first data bus and the second data bus;
wherein the interface device comprises a control memory that stores the command data outputted from the control device, and the interface device is controlled in accordance with the command data stored in the control memory so as to selectively connect together one of: (i) the first data bus and the image memory, (ii) the second data bus and the image memory, and (iii) the first data bus and the second data bus.

22. The system of claim 21, wherein the interface device comprises a first two-way interface section connected with the first data bus, a second two-way interface section connected with the second data bus, an internal data bus provided between the first two-way interface section and the second two-way interface section, and a branch data bus branched from the internal data bus and connected with the image memory, and wherein the first two-way interface section, the second two-way interface section and the internal data bus are controlled in accordance with the command data stored in the control memory.

23. The system claim 21, wherein the interface device comprises a memory control device that is provided between the branch data bus and the image memory, and that controls data transmission between the branch bus and the image memory.

24. The system of claim 21, wherein the control device outputs the command data when data are transmitted between the first data bus and the image memory, when data are transmitted between the second data bus and the image memory, and when data are transmitted between the first data bus and the second data bus, and wherein the command data are stored each time in the control memory.

25. The system of claim 21, further comprising a data receiving device that receives external image data from an external device, and wherein the external device is connected to one of the first data bus and the second data bus through a two way interface device.

26. The system of claim 25, wherein the data receiving device receives the external image data through an external communication line.

* * * * *